United States Patent
Kofler

[19]

[11] Patent Number: 6,116,617
[45] Date of Patent: Sep. 12, 2000

[54] MULTIPLE-JAW CHUCK FOR A LARGE WORKPIECE

[75] Inventor: Martin Kofler, St. Felix, Italy

[73] Assignee: Rohm GmbH, Sontheim, Germany

[21] Appl. No.: 09/273,154

[22] Filed: Mar. 19, 1999

[30] Foreign Application Priority Data

Mar. 20, 1998 [DE] Germany .......................... 198 12 267

[51] Int. Cl.⁷ ........................... B23B 31/16; B23B 31/18; B23B 31/30
[52] U.S. Cl. ........................ 279/133; 279/2.09; 279/4.12; 279/106; 279/127; 279/132; 279/137
[58] Field of Search ................................. 279/2.09, 2.24, 279/4.12, 106, 107, 110, 127, 121, 132, 133, 137

[56] References Cited

U.S. PATENT DOCUMENTS

| | | | |
|---|---|---|---|
| 2,904,339 | 9/1959 | Swanson et al. ........................ | 279/133 |
| 3,560,009 | 2/1971 | Renoux . | |
| 3,814,449 | 6/1974 | Buck ..................................... | 279/20.9 |
| 3,871,670 | 3/1975 | Wright .................................. | 279/20.9 |
| 5,052,700 | 10/1991 | Howard et al. ......................... | 279/106 |
| 5,429,375 | 7/1995 | Mueller et al. ......................... | 279/133 |
| 5,429,376 | 7/1995 | Mueller et al. ......................... | 279/133 |
| 5,441,287 | 8/1995 | Mueller et al. ......................... | 279/133 |

FOREIGN PATENT DOCUMENTS 0862960  9/1998  European Pat. Off. .

Primary Examiner—Steven C. Bishop
Attorney, Agent, or Firm—Herbert Dubno; Andrew Wilford

[57] ABSTRACT

A chuck has a chuck body, an actuating element limitedly axially displaceable in the body, a first set of guide pistons axially fixed in the actuating element, angularly spaced about the axis, and each forming a guide passage extending at a small acute angle to the chuck axis, and a second set of guide pistons limitedly axially movable in the actuating element, angularly spaced about the axis, interleaved with the axially fixed guide pistons, and each forming a guide passage extending at a small acute angle to the chuck axis. Respective jaw bolts slidable in the passages each have an outer end projecting forward from the chuck body and a rear end axially coupled to the chuck body. The outer ends of the jaw bolts of the axially fixed pistons define a fixed-jaw circle centered on the chuck axis and the outer ends of the jaw bolts of the axially movable pistons define a movable-jaw circle centered on the axis. The movable pistons in the actuating element can be axially displaced to thereby radially displace the outer ends of the respective jaw bolts in the movable pistons independently of the jaw bolts of the axially fixed pistons between an outer position with the movable-jaw circle radially offset from the other circle and an inner position with the circles substantially congruent. The actuating element can be displaced axially in the chuck body to radially displace the outer ends of all of the jaw bolts.

18 Claims, 8 Drawing Sheets

MULTIPLE-JAW CHUCK FOR A LARGE WORKPIECE

FIELD OF THE INVENTION

The present invention relates to a multiple-jaw chuck for a large workpiece. More particularly this invention concerns such a chuck having bolt-type jaws that can internally or externally engage a rotation-symmetrical workpiece.

BACKGROUND OF THE INVENTION

A standard chuck for a large workpiece has a chuck body rotatable about and centered on an axis and a plurality of angularly spaced jaws radially displaceable on the chuck body. Means is provided for synchronously moving the jaws inward or outward so as to inwardly or outwardly engage a surface of the workpiece and retain it on the chuck body which is then rotated while a tool is engaged with the workpiece to cut, grind, finish, or otherwise machine it.

When turning a large rotation-symmetrical workpiece like a brake disk, flywheel, ring gear, bearing ring, or the like it is necessary to rotate the workpiece about its symmetry axis. At the same time the workpiece must be held solidly enough that, when it is engaged by a cutting, grinding, or other tool it will move in the chuck. Finally it is critical that the force brought to bear to hold the workpiece not be so great as to deform it.

The existing chucks have the considerable disadvantage that, the workpiece has to be very carefully centered on the chuck body before the jaws are brought into engagement with it. If it is not perfectly positioned it is possible for some of the jaws to engage it and hold it before others so that the workpiece will be deformed. If machined while deformed, the workpiece will not be rotation symmetrical when it returns to its normal shape after being dechucked.

OBJECTS OF THE INVENTION

It is therefore an object of the present invention to provide an improved multiple-jaw chuck for a large workpiece.

Another object is the provision of such an improved multiple-jaw chuck for a large workpiece which overcomes the above-given disadvantages, that is which ensures that the workpiece will be perfectly centered on the chuck body before the full clamping force is brought to bear on it.

SUMMARY OF THE INVENTION

A chuck has according to the invention a chuck body adapted to be rotated about a chuck axis, an actuating element limitedly axially displaceable in the body, a first set of guide pistons axially fixed in the actuating element, angularly spaced about the axis, and each forming a guide passage extending at a small acute angle to the chuck axis, and a second set of guide pistons limitedly axially movable in the actuating element, angularly spaced about the axis, interleaved with the axially fixed guide pistons, and each forming a guide passage extending at a small acute angle to the chuck axis. Respective jaw bolts slidable in the passages each have an outer end projecting forward from the chuck body and a rear end axially coupled to the chuck body. The outer ends of the jaw bolts of the axially fixed pistons define a fixed-jaw circle centered on the chuck axis and the outer ends of the jaw bolts of the axially movable pistons define a movable-jaw circle centered on the axis. The movable pistons in the actuating element can be axially displaced to thereby radially displace the outer ends of the respective jaw bolts in the movable pistons independently of the jaw bolts of the axially fixed pistons between an outer position with the movable-jaw circle radially offset from the other circle and an inner position with the circles substantially congruent. The actuating element can be displaced axially in the chuck body to radially displace the outer ends of all of the jaw bolts.

The chuck according to the invention has the advantage that the workpiece can be secured in place without deforming it at all. First the centering jaws of the axially fixed pistons are brought into engagement with the workpiece, then once it is properly centered, the remaining jaws are moved into position by means of their pistons. Once all the jaws are set, the actuating element is shifted backward to bring them all to bear with considerable force, solidly locking the workpiece to the chuck.

The angle of the jaw axes to the chuck axis is very small so that a self-locking effect can be achieved. According to the invention the movable pistons are displaceable through a predetermined axial stroke and in the outer position the movable-jaw circle is offset from the fixed-jaw circle by a spacing equal to half of the product of the stroke and the tangent of the acute angle.

In accordance with the invention wherein there are three axially fixed pistons. There are substantially more, normally at least six, axially movable pistons. As a result of this large number of jaw bolts, the workpiece will be very uniformly stressed. Nonetheless since only three jaws are used for the initial centering, the workpiece will be centered perfectly since three points define a circle and the workpiece according to the invention is invariably rotation symmetrical.

The means for displacing the movable pistons according to the invention includes hydraulically pressurizable compartments between the movable pistons and the actuating element. More specifically each movable piston is received in a chamber and has a radially projecting ridge subdividing the chamber into front and rear compartments that can be individually pressurized for double action, that is forcible hydraulic displacement axially forward or axially rearward. By accurate control of the pressurization of the forward compartment responsible for clamping displacement of the jaws of the axially movable pistons, it is possible to position these jaws perfectly with no deformation of the workpiece.

Means is provided for locking the movable pistons axially to the actuating element. This insures that once clamping action is undertaken by the actuating element, all the jaws will move synchronously and identically. This locking effect can be achieved by increasing the pressure in the appropriate compartment as the actuating element is pulled back, or simply by closing a valve that prevents fluid from existing from the compartment so the piston is locked to the actuating element.

Furthermore according to the invention abutments are provided on the chuck body between the jaws for positioning a workpiece thereon. These abutment serve for initial positioning and mainly serve to set the workpiece in a plane perpendicular to the chuck axis, although they may also serve some rough centering function too.

Each bolt rear end is formed in accordance with the invention with a notch engaging over an edge of the chuck body. More particularly the actuating element is formed at each bolt rear end with an axially rearwardly open groove in which the respective jaw bolt normally sits. Respective spring-loaded members bear axially forward against the bolts and urging the bolts axially forward into the respective grooves. Furthermore each of the pistons is centered on a respective piston axis parallel to the chuck axis and is rotatable in the actuating element about the respective piston axis. Formations are provided on the pistons and on the chuck body defining for each piston a pair of 180° offset positions. An intermediate plate having at each piston can be formed with a noncircular hole in which the respective piston fits complementarily and which constitutes one of the formations. Thus it is possible to rotate the pistons 180° for inner or outer gripping.

The chuck body according to the invention has respective pairs of inclined surfaces engageable with the rear ends of the jaw bolts. Furthermore the pistons are received with limited play in the actuating element and are limitedly tippable therein on high-speed rotation of the chuck.

The jaw bolts of the axially fixed pistons are movable radially in one direction on rearward retraction of the actuating element and the jaw bolts of the axially movable pistons are movable radially in the opposite direction on rearward retraction of the actuating element so that a workpiece is gripped inwardly and outwardly by the jaw bolts. According to this feature of the invention one of the sets of jaws can therefore be set for inner gripping and the other for outer gripping, very effectively centering and securing the workpiece on the chuck. This effect is enhanced when the jaw bolts of one of the set of guide pistons are provided with outrigger bodies that engage the workpiece radially directly opposite the jaw bolts of the other set of guide pistons. Thus deformation of the workpiece is impossible.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
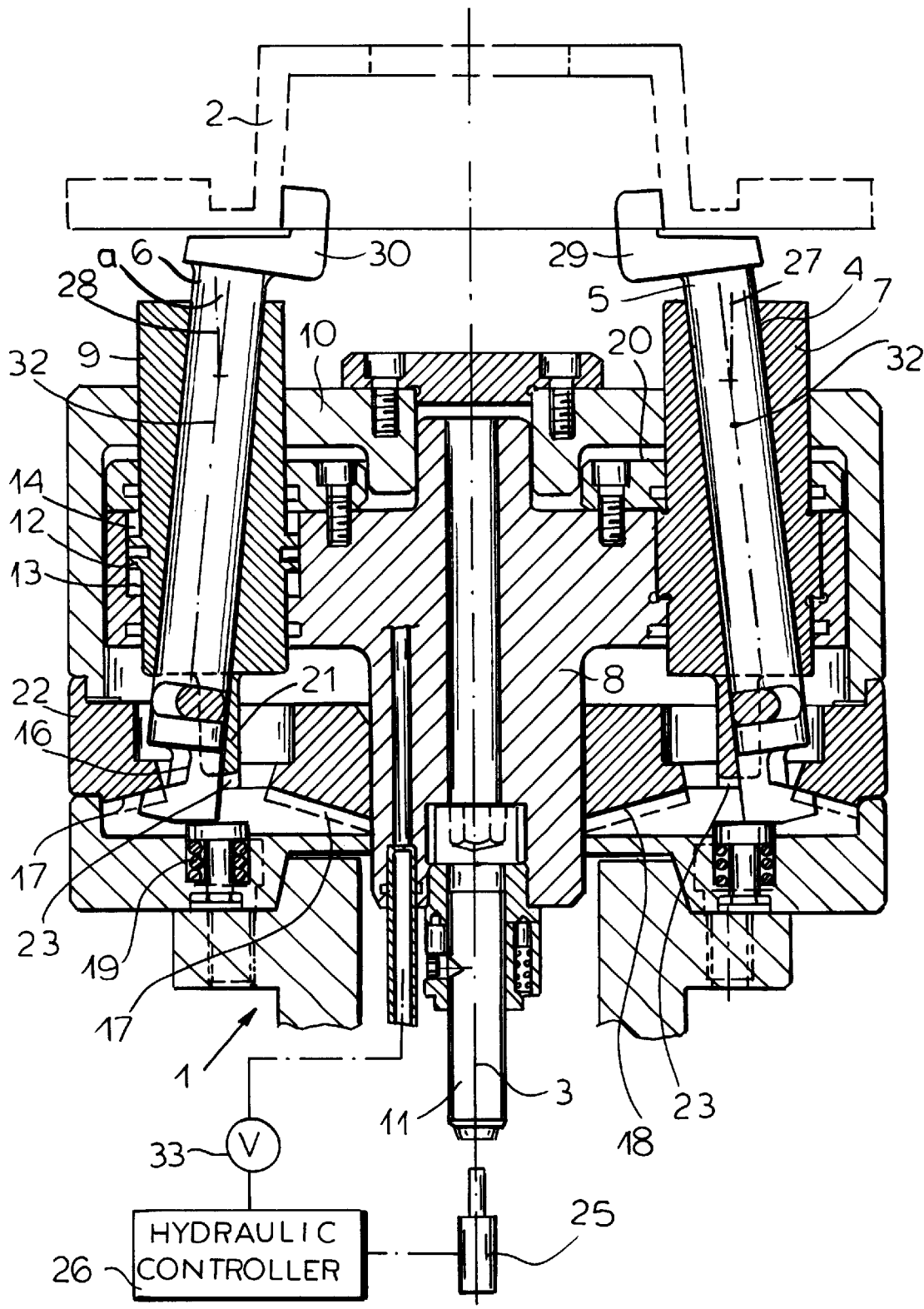
FIG. 1 is a partly diagrammatic axial section through the chuck according to the invention set up for internal gripping.
Figure 2:
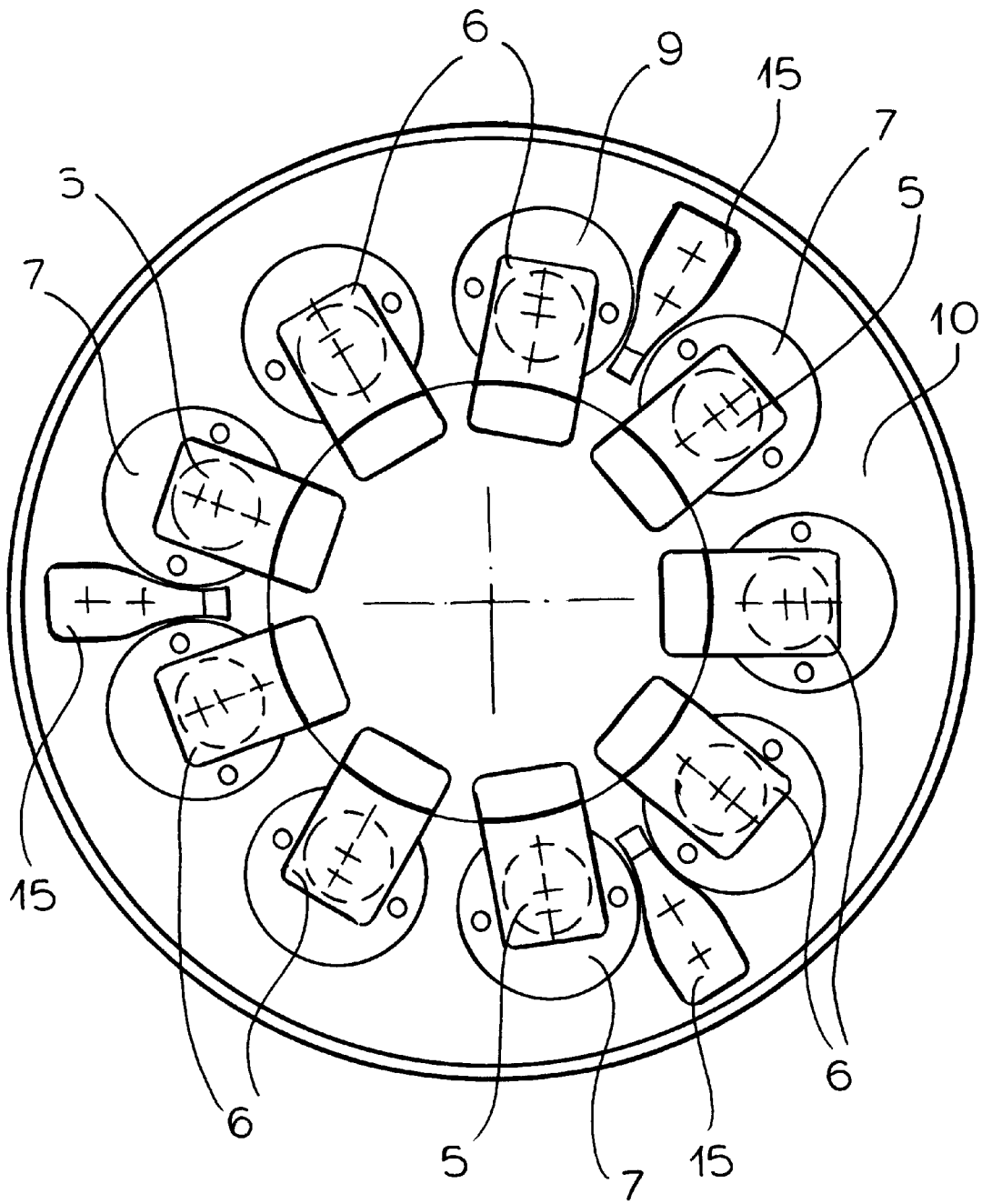
FIG. 2 is a top view of the chuck of FIG. 1.

As seen in FIGS. 1 and 2 a chuck 1 according to the invention has a body 10 centered on and rotatable about an axis 3 and intended to hold a workpiece 2, here a brake disk. The chuck 1 carries three angularly equispaced centering jaw bolts 5 and, interleaved between them, six substantially identical holding jaw bolts 6. The bolts 5 and 6 ride in respective guide passages 4 having axes 32 inclined at a small acute angle α to the axis 3 and have respective L-shaped holding blocks 29 and 30 at their outer ends.

The jaw bolts 5 are guided in respective pistons 7 that are axially fixed in a main actuating piston or plate 8 and that are centered on and rotatable in the plate 8 about respective axes 27 parallel to the axis 3 as will be described below. The jaw bolts 6 are guided in respective pistons 9 that are limitedly axially displaceable in the plate 8 and that are centered on and rotatable about respective axes 28 parallel to the axis 3 like the axes 27. The guide passages 4 are formed in the pistons 7 and 9. Each piston 9 is formed with a radially projecting flange 12 defining an annular rear compartment 13 pressurizable from a controller 26 to move the piston 9 axially forward (upward in FIG. 1) and an annular front compartment 14 also pressurizable for axially opposite rearward movement. The plate 8 is connected by a bolt 11 to a hydraulic cylinder 25 operated by the controller 26. Axial movement of the pistons 9 will radially move the holding blocks 29 and 30 radially. When the pistons 9 are retracted through their full axial stroke, that is in their axial rearmost positions, the outer ends of the jaw bolts 6 define a circle spaced radially inward of a circle defined by the outer ends of the jaw bolts 5 by a distance equal to half the product of the axial stroke and the tangent of angle a.

Figure 5:
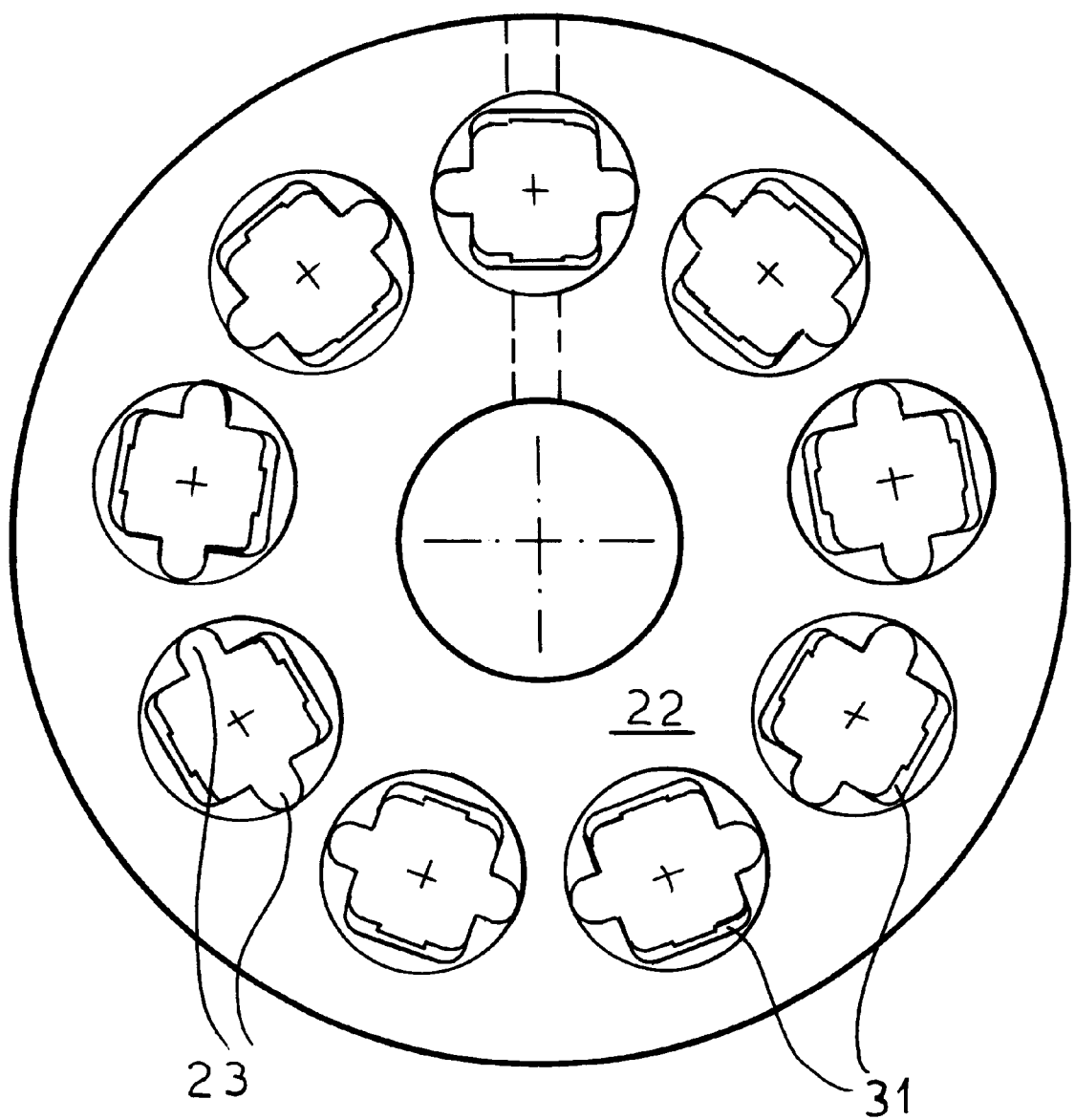
FIG. 5 is a top view of an element of the chuck.

Each jaw bolt 5 and 6 has a rear end formed with a notch 16 engaging around the edge of a respective opening 31 in an intermediate plate 22 of the chuck body 10 to engage in one of two respective radially extending grooves 18 formed in a rear face 17 of the plate 22. In addition the rear end of each jaw bolt 5 and 6 bears on a spring-loaded bolt 19 that pushes it axially forward, into engagement in the groove 18 where it bears axially forward on the chuck body 10 and cannot, therefore, move axially relative to the chuck body 10. The holes 31 of the plate 22 as shown in FIG. 5 are each formed at each piston 7 and 9 with axially extending grooves 23 into which can engage complementary rear extensions 21 of the pistons 7 and 9 so that each piston 7 and 9 can assume two 180° offset positions relative to the plate 22.

Such a chuck 1 is operated as follows:

The plate 8 is initially advanced to draw the elements 29 and 30 inward and the chambers 13 are pressurized to advanced the pistons 9, thereby drawing the elements 30 into their inner position. This leaves the elements 30 of the jaw bolts 6 radially somewhat inward of the element 29 of the jaw bolts 5.

Then the workpiece 2 is set over the chuck 1 on three centering abutments 15 (FIG. 2) and the plate 8 is retracted with light force until the three centering jaw bolts 5 engage the inner periphery of the workpiece 2 with their holding elements 29. This centers the workpiece 2 accurately on the chuck 1.

The chambers 14 are then pressurized to pull back the pistons 9 and move out the blocks 30, bringing them also into contact with the inner periphery of the workpiece 2. The chambers 14 are pressurized so that the jaw bolts 4 exert the same radial force on the workpiece 2 as the bolts 5 to avoid deforming it. At this point the workpiece 2 is lightly held at nine angularly equispaced points.

Subsequently the plate 8 is retracted forcibly. As this is done the pistons 9 are locked against movement in the plate 8 either by blocking any liquid from entering and exiting the compartments 13 and 14, for instance by closing a valve 33, or by increasing the pressure in the compartment 14 as the plate 8 is pulled back. This has the result of bringing the blocks 29 and 30 into forceful radial outward engagement with the workpiece 2, locking it in place. The chuck 1 can then be rotated about its axis 3 and machining can progress as is standard.

Figure 3:
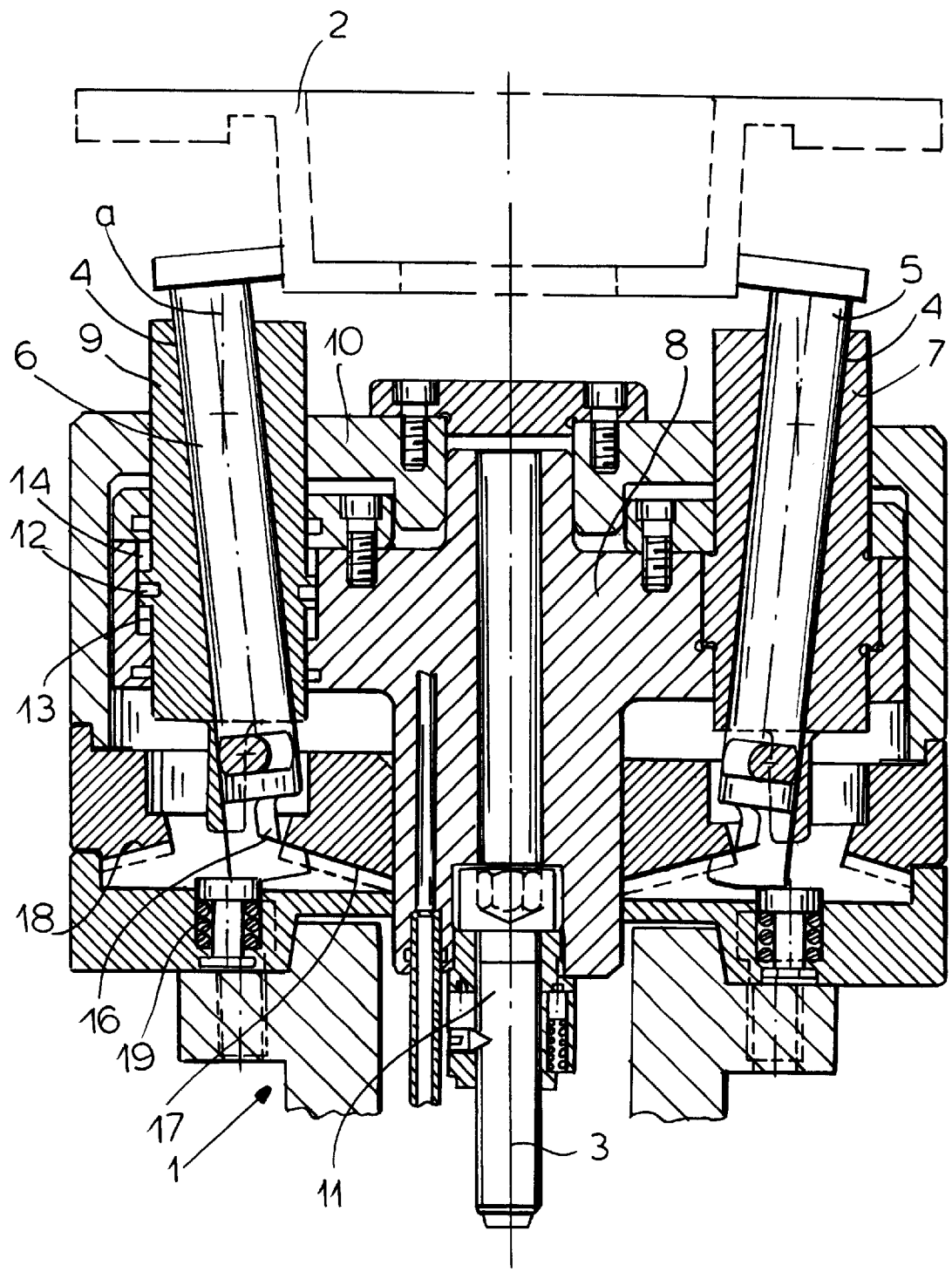
FIG. 3 is a view like FIG. 1 but showing the chuck set up for external gripping.
Figure 4:
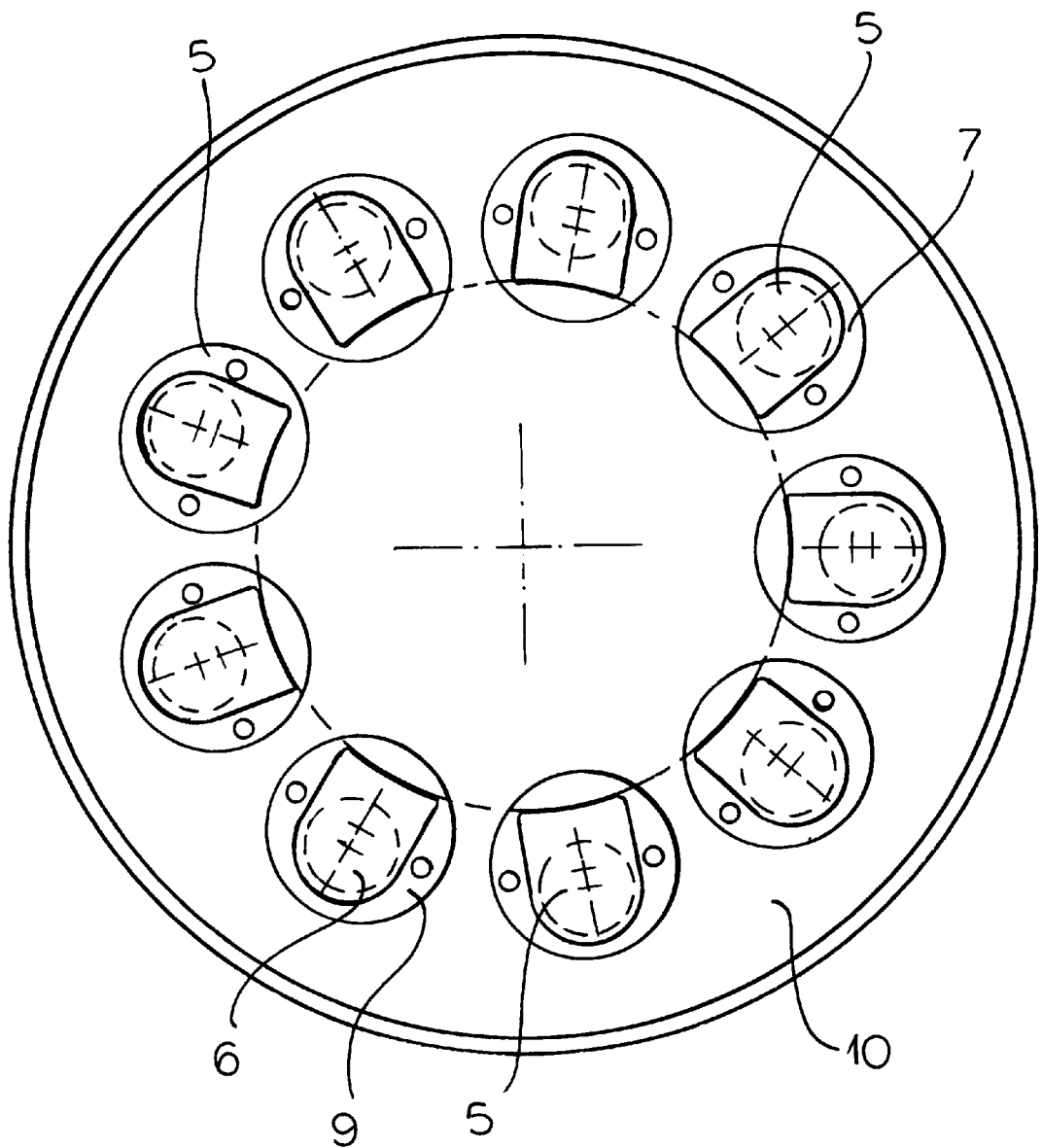
FIG. 4 is a top view of the chuck of FIG. 3.

While FIGS. 2 and 3 show the chuck 1 in use for engaging an inner periphery of a workpiece 2, FIGS. 3 and 4 show its use engaging radially inwardly on the outer periphery of the workpiece 2. To change over from the one mode of operation to the other, the plate 8 is first advanced until its front face 20 abuts the back of the front plate of the chuck body 10. Then the chambers 13 are pressurized to fully axially advance the pistons 9. This action pulls the extensions 21 out of the complementary formations 23 of the holes 31 of the plate 22. Each of the jaw bolts 5 and 6 is then pushed axially downward so its rear end can disengage from the outer groove 18 it is in and then it is rotated with its piston 7 or 9 through 180° so it can engage in the respective inner groove 18, whereupon each bolt jaw 5 or 6 is released so the respective spring-loaded bolt 19 can push it back up into this groove 18. In this position as shown in FIG. 3, axial forward advance of the pistons 9 will move the jaw bolts 6 radially inward, and axial retraction of the plate 8 will move both the jaw bolts 5 and 6 inward so that once the changeover is made operation is identical as with the embodiment of FIGS. 1 and 2.

Figure 6:
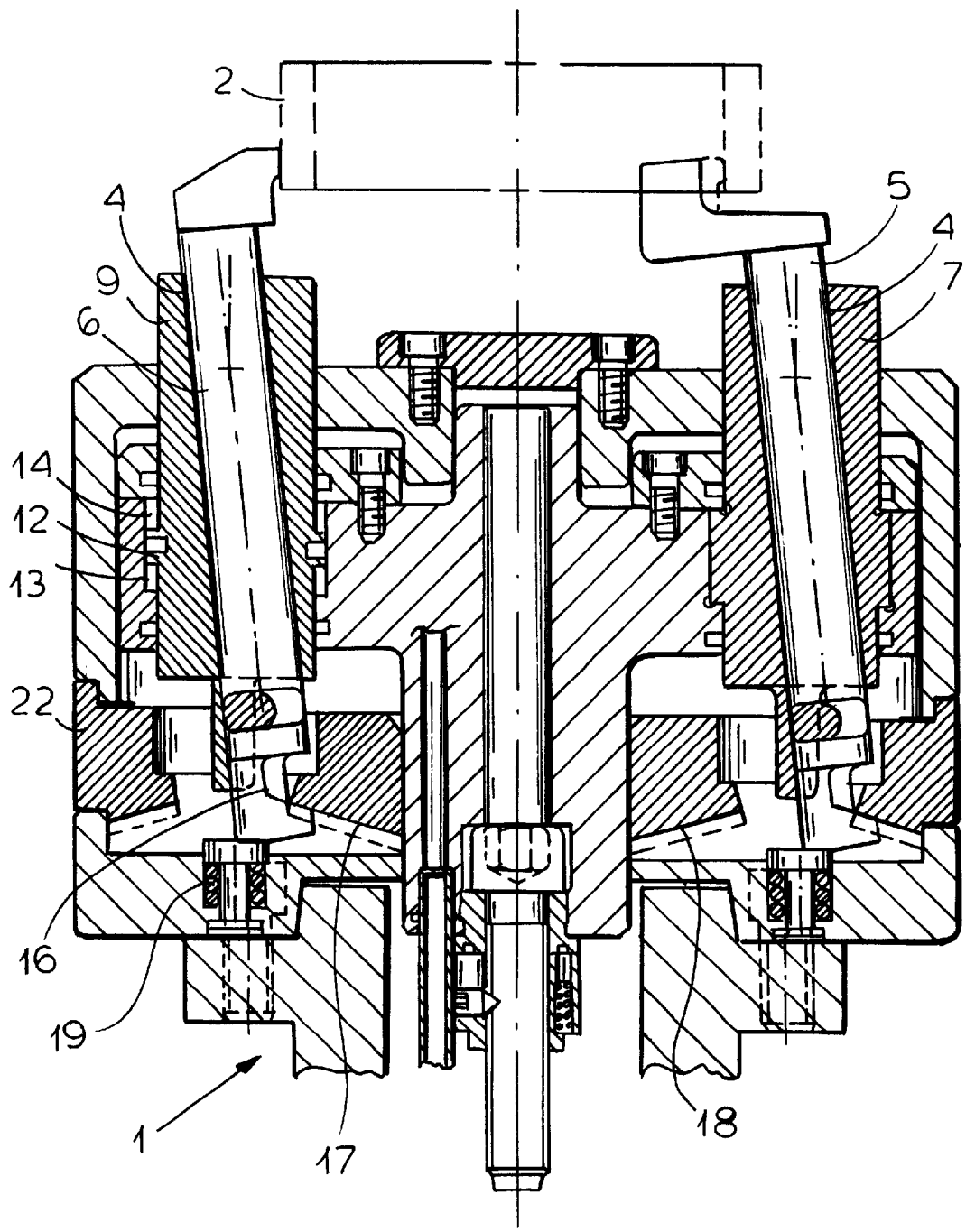
FIG. 6 is a view like FIG. 1 with combined internal and external gripping.

FIG. 6 further shows how the jaws 5 can be set for inward engagement and the bolts 6 for outward engagement so the workpiece 2 will be centered from inside and held from outside.

Figure 7:
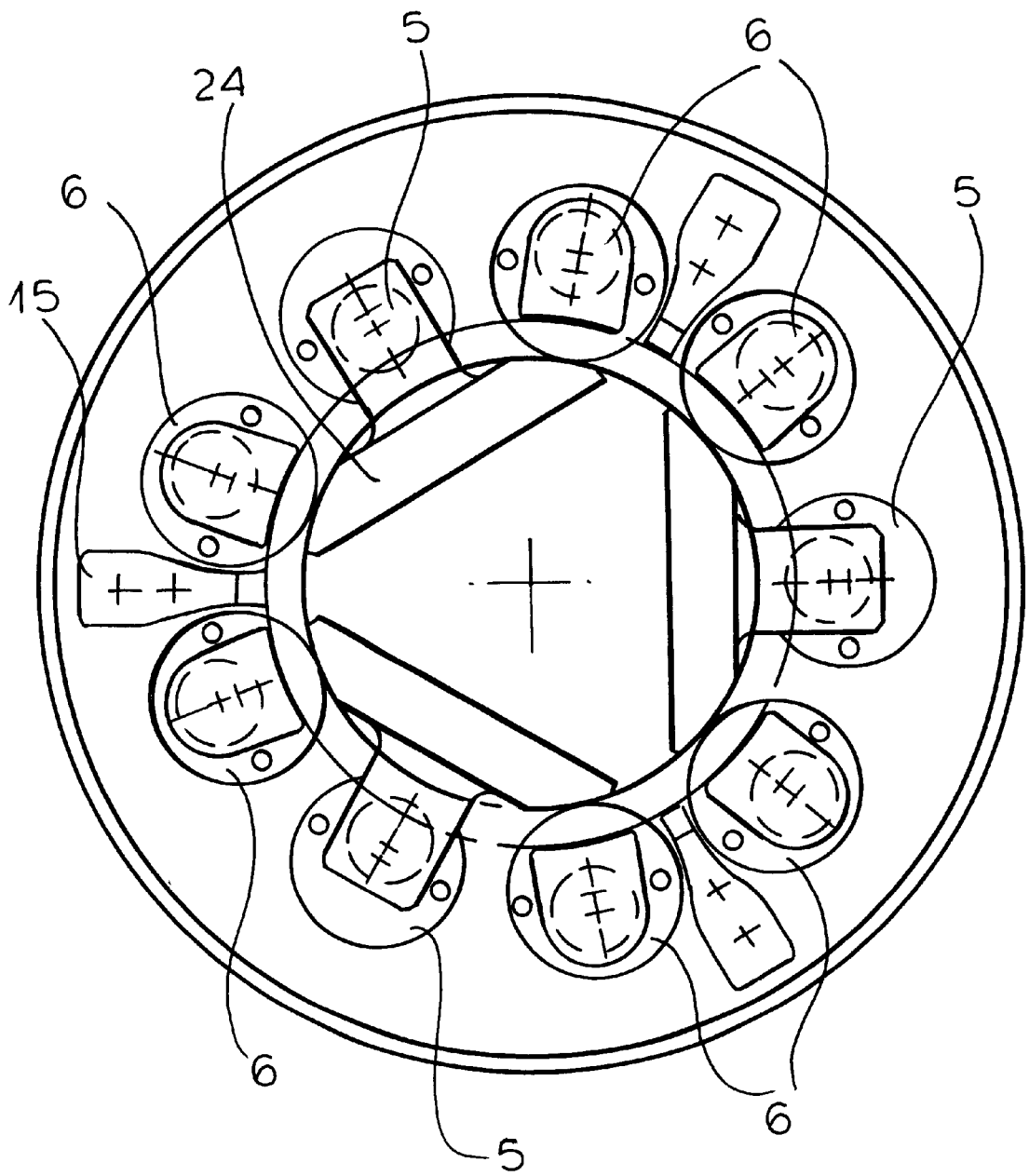
FIGS. 7 and 8 are end views of variations on the chuck as shown in FIG. 6.
Figure 8:
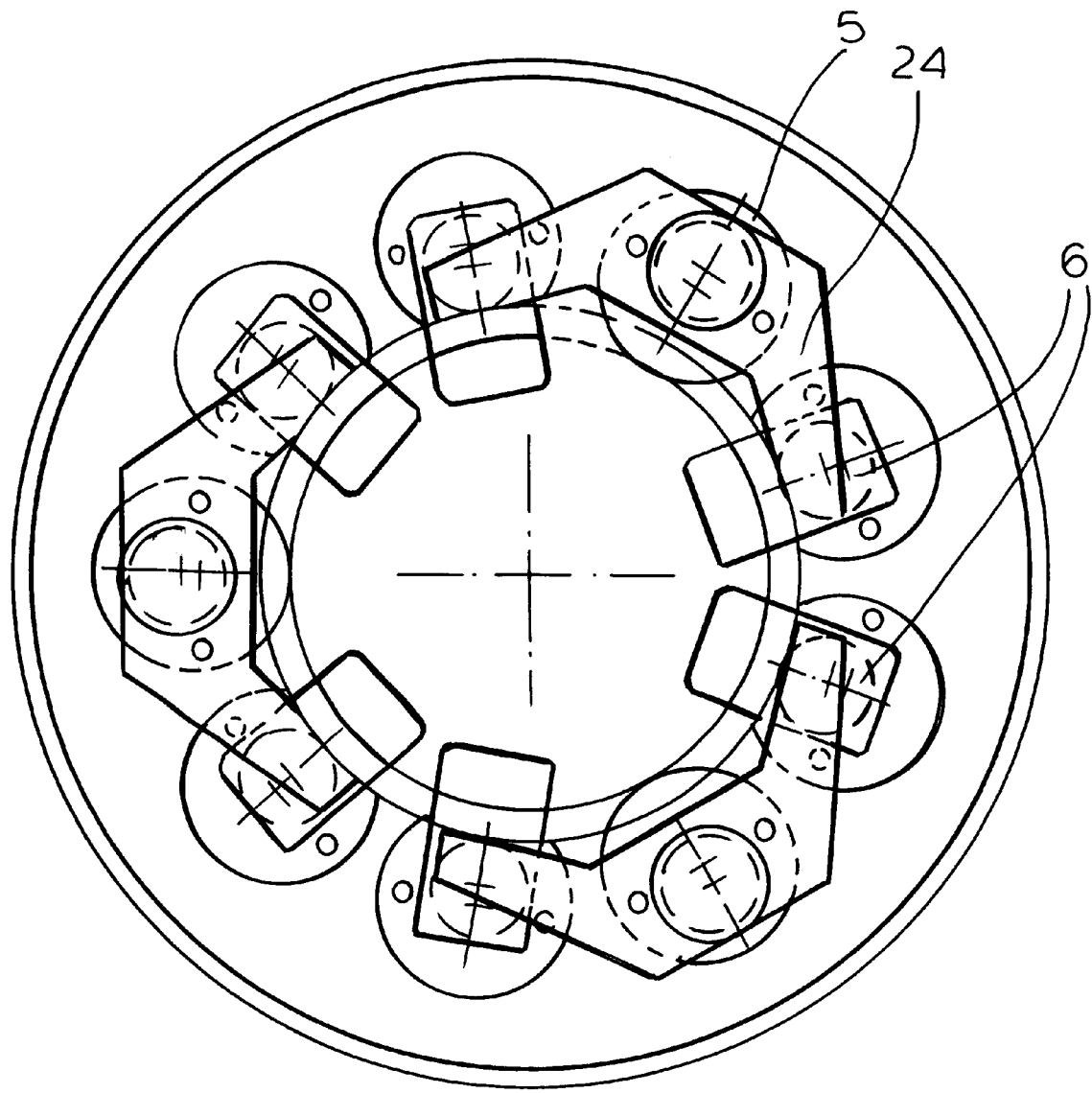

FIGS. 7 and 8 show how the jaw bolts 5 can carry outrigger bodies 24 that engage the workpiece 2 at several different locations each radially directly aligned with one of the locations of the movable jaw bolts 6.

I claim:

1. A chuck comprising:
    a chuck body adapted to be rotated about a chuck axis;
    an actuating element limitedly axially displaceable in the body;
    a set of guide pistons axially fixed in the actuating element, angularly spaced about the axis, and each forming a guide passage extending at a small acute angle to the chuck axis;
    a set of guide pistons limitedly axially movable in the actuating element, angularly spaced about the axis, interleaved with the axially fixed guide pistons, and each forming a guide passage extending at a small acute angle to the chuck axis;
    respective jaw bolts slidable in the passages and each having an outer end projecting forward from the chuck body and a rear end axially coupled to the chuck body, the outer ends of the jaw bolts of the axially fixed pistons defining a fixed-jaw circle centered on the chuck axis and the outer ends of the jaw bolts of the axially movable pistons defining a movable-jaw circle centered on the axis;
    means for axially displacing the movable pistons in the actuating element and thereby radially displacing the outer ends of the respective jaw bolts in the movable pistons independently of the jaw bolts of the axially fixed pistons between an outer position with the movable-jaw circle radially offset from the other circle and an inner position with the circles substantially congruent; and
    means for axially displacing the actuating element in the chuck body and thereby radially displacing the outer ends of all of the jaw bolts.

2. The chuck defined in claim 1 wherein the movable pistons are displaceable through a predetermined axial stroke and in the outer position the movable-jaw circle is offset from the fixed-jaw circle by a spacing equal to half of the product of the stroke and the tangent of the acute angle.

3. The chuck defined in claim 1 wherein there are three axially fixed pistons.

4. The chuck defined in claim 3 wherein there are at least six axially movable pistons.

5. The chuck defined in claim 1 wherein the means for displacing the movable pistons includes hydraulically pressurizable compartments between the movable pistons and the actuating element.

6. The chuck defined in claim 5 wherein the means for displacing the movable pistons in the actuating element includes means for locking the movable pistons axially to the actuating element.

7. The chuck defined in claim 6 wherein the means for locking the movable pistons in the actuating element includes a valve closable to block fluid flow into and out of the compartments.

8. The chuck defined in claim 1, further comprising
    abutments on the chuck body for positioning a workpiece thereon.

9. The chuck defined in claim 1 wherein each bolt rear end is formed with a notch engaging over an edge of the chuck body.

10. The chuck defined in claim 9 wherein the actuating element is formed at each bolt rear end with an axially rearwardly open groove in which the respective jaw bolt normally sits.

11. The chuck defined in claim 10, further comprising
    respective spring-loaded members bearing axially forward against the bolts and urging the bolts axially forward into the respective grooves.

12. The chuck defined in claim 1 wherein each of the pistons is centered on a respective piston axis parallel to the chuck axis and is rotatable in the actuating element about the respective piston axis.

13. The chuck defined in claim 11 further comprising
    formations on the pistons and on the chuck body defining for each piston a pair of 180° offset positions.

14. The chuck defined in claim 13 wherein the chuck body includes an intermediate plate having at each piston a noncircular hole in which the respective piston fits complementarily and constituting one of the formations.

15. The chuck defined in claim 13 wherein the chuck body has respective pairs of inclined surfaces engageable with the rear ends of the jaw bolts.

16. The chuck defined in claim 1 wherein the pistons are received with limited play in the actuating element and are limitedly tippable therein on high-speed rotation of the chuck.

17. The chuck defined in claim 1 wherein the jaw bolts of the axially fixed pistons are movable radially in one direction on rearward retraction of the actuating element and the jaw bolts of the axially movable pistons are movable radially in the opposite direction on rearward retraction of the actuating element, whereby a workpiece is gripped inwardly and outwardly by the jaw bolts.

18. The chuck defined in claim 17 wherein the jaw bolts of one of the set of guide pistons are provided with outrigger bodies that engage the workpiece radially directly opposite the jaw bolts of the other set of guide pistons.

* * * * *